United States Patent Office 3,231,629
Patented Jan. 25, 1966

3,231,629
PROCESS FOR THE ARYLATION OF
AROMATIC COMPOUNDS
Ernest Bryson McCall, Llangollen, Denbighshire, and Ryland James Roberts, Glynceiriog, near Wrexham, Denbighshire, Wales, assignors to Monsanto Chemicals Limited, London, England, a British company
No Drawing. Filed Nov. 6, 1961, Ser. No. 150,120
Claims priority, application Great Britain, Nov. 9, 1960, 38,428/60
9 Claims. (Cl. 260—670)

This invention relates to a new process by which an aromatic compound can be arylated.

By arylation of a compound is meant the introduction of an aromatic group, that is to say the group remaining on removal of a nuclear hydrogen atom from a cyclic system that is stabilized by the presence of non-localized $\pi$-electrons, for instance a phenyl group or a pyridyl group. A typical arylation is, for instance, the introduction of a phenyl group into diphenyl to produce terphenyl.

The introduction of an aromatic group such as, for instance, a phenyl group does, in principle, constitute an important reaction, and the formation of a terphenyl referred to above is of course only one example of the type of compound that can be produced. The terphenyls and other related compounds are themselves valuable products, by virtue of the fact that they are stable liquids at elevated temperatures. The terphenyls are of particular significance in that they are also materials which are stable to the effects of atomic radiation and which possess good neutron-moderating properties. They can accordingly be employed as functional fluids, for instance as moderator-coolants, in nuclear reactors.

The arylation reaction that has now been discovered provides a valuable new route to many aromatic compounds. Such compounds are obtained in a relatively high state of purity and in the absence of large quantities of undesirable, dark-colored by-products.

The process of the invention is one for the arylation of an aromatic compound, in which said compound is heated with an arylating agent that is an aromatic substance containing, linked to a nuclear carbon atom, a sulphonyl halide group, a sulphonic acid group, or a sulphonic acid group in the form of a salt that decomposes at the reaction temperature.

The aromatic compounds that can be arylated are compounds that possess a cyclic system that is stabilized by the presence of non-localized $\pi$-electrons, for instance benzene, diphenyl, naphthalene, benzofuran, thiophene or pyridine.

Particularly excellent results are obtained in the process when the substance employed as the arylating agent is an aromatic sulphonyl chloride or bromide, or an aromatic sulphonic acid.

The process is normally carried out at an elevated temperature, for example a temperature higher than 125° C., and preferably above 150° C. or 175° C. Good results are obtained using a reaction temperature in the range of 200° C. to 300° C., for instance between 220° C. or 240° C. and 275° C. In practice, the requirement as to reaction temperature means that the process is particularly convenient for the arylation of aromatic compounds that are relatively high boiling, for example diphenyl. In the instance of more volatile compounds, however, a high reaction temperature can be obtained by carrying out the process under a suitably elevated response.

The aromatic compounds that can be arylated include the carbocyclic compounds such as benzene and condensed benzenoid systems such as for instance naphthalene, and aromatic compounds having a heterocyclic ring such as for instance furan and thiophene. Nitrogen-containing compounds such as for instance pyridine and quinoline can be employed if desired, although owing to their basicity there is the likelihood of unwanted side reactions taking place; the process is therefore somewhat less useful in respect to such compounds. More than one type of ring can be present in the compound as in the case of compounds such as benzothiophene or dibenzthiophene. Where, for instance, a compound contains two rings, the arylation can take place in either or both of them. In general the aromatic compound can contain a substituent, for example an aliphatic group, for instance an alkyl or cycloalkyl group, such as a methyl, ethyl, octyl, nonyl or cyclohexyl group, an aromatic group, for instance an aryl group, such as a phenyl or tolyl group; a halogen atom, for example chlorine or bromine; a carboxylic ester group; an alkoxy group, for instance a methoxy, ethoxy, butoxy or hexyloxy group; or an aryloxy group, for instance a phenoxy or tolyloxy group. Specific examples of aromatic compounds including substituted ones are: toluene, the xylenes, ethylbenzene, 2-methyl-2-phenyloctane, dodecylbenzene, diphenyl, o-, m- and p-terphenyl, quaterphenyl, 2-methyldiphenyl, 4-isopropyldiphenyl, 4, 4'-di-isopropyldiphenyl, 1-methylnaphthalene, 1,6-dimethylnaphthalene, indene, anthracene, 3-ethylanthracene, chlorobenzene, bromobenzene, p - chlorotoluene, o - dichlorobenzene, 2-chloronaphthalene, 4-chlorodiphenyl, anisole, phenetole, diphenyl ether, 2-ethylthiophene, 2-phenylthiophene, thiophene-2-carboxylic ethyl ester, benzofuran, 4-methylbenzofuran, 5-bromobenzofuran, 6-methoxybenzofuran, 4-phenylbenzofuran, dibenzofuran, 2,8-dichlorodibenzofuran, 2-ethoxybenzothiophene and 4-bromodibenzothiophene.

The arylating agent is a substance containing an aromatic radical linked by a nuclear carbon atom to one of the specified groups, for instance the sulphonyl halide group, and in principle the aromatic radical can be one derived from any of the aromatic compounds referred to above as capable of being arylated in the process of the invention. In practice the arylating agent is often one containing a relatively simple aromatic radical, such as for instance a phenyl, ethylphenyl chlorophenyl or nitrophenyl radical. However, the arylating agent can, in general, be one containing a carbocyclic aromatic radical such as phenyl or a condensed benzenoid radical such as naphthyl, or an aromatic radical having a heterocyclic ring such as a furyl, thienyl or pyridyl radical. More than one type of ring can be present, for instance the radical can be benzothienyl, dibenzothienyl or quinolinyl. In general the radical can contain a substituent, for example an aliphatic group, for instance an alkyl or cycloalkyl group, such as a methyl, octyl, nonyl or cyclohexyl group; an aromatic group, for instance an aryl group, such as a phenyl or tolyl group; a halogen atom, for example chlorine or bromine; a nitro group; a carboxylic ester group, for instance a carbethoxy group; an alkoxy group, for instance a methoxy, ethoxy, butoxy or hexyloxy group; or an aryloxy group, for instance a phenoxy or tolyloxy group.

In general the arylating agent can contain one or more of the specified groups, that is to say a sulphonyl halide group, a sulphonic acid group, or a sulphonic acid group in the form of a salt that decomposes at the reaction temperature; the arylating agent can for instance be a benzenesulphonyl halide or a benzenedisulphonyl halide. An example of an arylating agent containing a sulphonic acid group in the form of a salt that decomposes in the process to a free sulphonic acid group is an ammonium salt of an aromatic sulphonic acid. Specific examples of arylating agents are benzene sulphonyl chloride, toluenesulphonyl chloride, isopropylbenzenesulphonyl chloride, t-butylbenzenesulphonyl chloride, p-nitrobenzenesulphonyl chloride, pyridine-3-sulphonyl chloride, p-phenylbenzenesulphonyl chloride, benzenesulphonyl bromide, m-benzenedisulphonyl chloride, 4,4'-diphenyl disulphonyl chloride, benzenesulphonic acid, naphthalenesulphonic acid and ammonium benzenesulphonate.

The arylation reaction proceeds smoothly at the appropriate elevated temperature, and the presence of a catalyst is not essential. Neither is the presence of a solvent essential, although one can be employed if desired, particularly a high-boiling inert solvent such as for instance hexachlorobenzene or some other perhalogenated substance.

Good results are obtained when, relative to the quantity of the arylating agent, the quantity of the compound to be arylated in the process is large; the excess can, for example, be 5 to 25 times the molar equivalent, for instance about 10 to 20 times. However, a smaller excess, for example 2 or 3 times the molar equivalent, or equimolecular proportions, can be employed. Moreover, particularly where it is desired to arylate the compound in more than one position, it is sometimes appropriate to employ an excess of the arylating agent.

The reaction time will depend on the reaction temperature and other factors, but a time of between 2 hours and 12 hours is often satisfactory, for instance a reaction time of about 3 to 6 hours. A longer reaction time may be advantageous sometimes, for example up to 20 or 30 hours or even longer.

The product of the process of the invention is in many instances a mixture of isomers; appropriate arylation of diphenyl for example gives a mixture of o-, m- and p-terphenyl. In many instances, such as for use as a functional fluid, it is not essential that such isomers should be separated from each other, but simply that, for example, they should be isolated as a mixture from unchanged starting materials. If necessary, however, it is normally practical to separate a mixture of isomers, for example by fractional distillation or possibly by fractional crystallization.

The process of the invention is illustrated by the following examples:

Example 1

This example describes the production of a mixture of terphenyls from diphenyl and benzenesulphonyl chloride.

A mixture of 10.0 grams (0.057 mol.) of benzenesulphonyl chloride and 250 grams (1.625 mol.) of redistilled diphenyl was heated to boiling under reflux at a temperature of about 255°–275° C. for five hours; sulphur dioxide and hydrogen chloride were evolved.

At the end of this time the resulting mixture was subjected to fractional distillation under reduced pressure to give 10.53 grams of a mixture of terphenyls; this was a yield of 81% of the theoretical value based on the benzenesulphonyl chloride.

Analysis of the mixture by vapor phase chromatography showed that it had the following composition:

| | Percent |
|---|---|
| o-terphenyl | 30.6 |
| m-terphenyl | 25.6 |
| p-terphenyl | 24.8 |
| Sulphones | ≯1.3 |

Example 2

This example describes the production of a mixture of phenyl dibenzothiophenes by arylation of dibenzothiophene with benzenesulphonyl chloride.

A mixture of 13.8 grams (0.078 mol.) of benzenesulphonyl chloride and 200 grams (1.1 mol.) of dibenzothiophene was heated at a temperature between 250–270° C. for 5 hours.

Fractional distillation of the resulting mixture at a pressure of 1 mm. of mercury gave 11.0 grams of a mixture of monophenyl dibenzothiophenes as a brown oil, boiling point 193–250° C. at 1 mm. of mercury; the oil solidified on standing. The yield was 54% of theory based on the benzenesulphonyl chloride.

Example 3

This example describes the production of a mixture of terphenyls from diphenyl and benzenesulphonic acid.

A mixture of 17.9 grams (0.097 mol.) of benzenesulphonic acid sesquihydrate and 250 grams (1.6 mol.) of diphenyl was boiled under reflux at 256° C. under atmospheric pressure for 5 hours.

Fractional distillation of the resulting product under reduced pressure resulted in the isolation from unreacted diphenyl of 6.6 grams of terphenyls (30% of the theoretical yield).

Example 4

This example describes the production of diphenyl from benzene and benzenesulphonyl chloride.

A solution of 4.7 grams of benzensulphonyl chloride in 60 cc. of benzene was placed in a bottle. This in turn was placed in an autoclave containing a further 60 cc. of benzene. The autoclave was then heated to 240–250° C. for 2 hours, during which time the pressure rose to 26 atmospheres. The presence of benzene in the autoclave exterior to the bottle served to reduce evaporation of benzene from the solution in the bottle. After cooling, the liquids in the bottle and autoclave were combined and filtered. Evaporation of the benzene from the filtrate gave 3.5 grams of an oily residue from which 0.5 gram of diphenyl was isolated by distillation as a fraction having a boiling point of 80° C. at a pressure of 0.8 mm. of mercury.

Example 5

This example describes the production of phenylnaphthalenes from naphthalene and benzenesulphonyl chloride.

A mixture of 19.9 grams (0.1125 mol.) of benzenesulphonyl chloride and 144 grams (1.125 mol.) of naphthalene was heated under reflux at 215–220° C. for 19 hours.

Unreacted naphthalene was distilled from the reaction mixture, leaving a residue which gave on distillation a major fraction having a boiling range of 118–123° C. at a pressure of 0.3 mm. of mercury, consisting essentially of a mixture of isomeric monophenylnaphthalenes, and a minor fraction having a boiling range from 123° C. to about 200° C. at the same pressure, containing diphenylnaphthalenes. The combined weight of the major and minor fractions was 20.8 grams.

Example 6

This example describes the production of methyl-p-diphenyloctanes from 2-methyl-2-phenyloctane and benzenesulphonyl chloride.

A mixture of 2.61 grams (0.015 mol.) of benzenesulphonyl chloride and 56 grams (0.275 mol.) of 2-methyl-2-phenyloctane was heated under reflux at a temperature of 250–255° C. for 3½ hours.

Distillation of the resulting mixture gave first unreacted 2-methyl-2-phenyloctane, followed by a fraction having a boiling range of abaut 120° to 150° C. at a pressure of 0.3 mm. of mercury, consisting largely of a mixture of approximately equal amounts of 2-methyl-2(p-biphenylyl)octane and 2-methyl-2(m-biphenylyl)octane.

Example 7

This example describes the production of diphenyl phenyl ethers from diphenyl ether and benzenesulphonyl chloride.

A mixture of 58.8 grams (0.3 mol.) of benzenesulfonyl chloride and 182.3 grams (1.07 mol) of diphenyl ether was heated at 230 to 250° C. for 5 hours.

Excess diphenyl ether was distilled from the reaction mixture and further distillation of the residue gave 18.9 grams of a pale yellow oil having a boiling range of 180 to 200° C. at a pressure of 2.8 mm. of mercury, consisting essentially of an isomeric mixture of diphenyl phenyl ethers.

Example 8

This example describes the production of a mixture of terphenyls from diphenyl and benzenesulphonyl bromide.

A mixture of 11 grams (0.05 mol.) of benzenesulphonyl bromide and 116 grams (0.75 mol.) of diphenyl was heated under reflux at a temperature of about 250–255° C. for 10 hours; sulphur dioxide and hydrogen bromide were evolved.

Unreacted diphenyl was recovered from the reaction mixture by distillation at a pressure of 1.5 mm. of mercury, leaving a residue from which 5.75 grams of mixed isomeric terphenyls were obtained by distillation at a pressure of 0.15 mm. of mercury.

Example 9

This example describes the preparation of m-1,3-bis-(diphenylyl)benzenes (a mixture of isomers) from diphenyl and benzene-m-disulphonyl chloride.

A mixture of 5.5 grams (0.02 mol.) of benzene-m-disulphonyl chloride and 92.5 grams (0.6 mol) of diphenyl was boiled under reflux at a temperature of about 255–257° C. for 2½ hours. At the end of this time, excess diphenyl was distilled from the reaction mixture, leaving 9.4 grams of a residue which set to a brown solid on cooling. This material gave the following elementary analysis:

C, 92.78; H, 5.81; S, 0.54%; Cl, trace; consistent with it being largely a mixture of 1,3-bis(diphenylyl)benzenes, $C_{30}H_{32}$, which requires: C, 94.2; H, 5.8%.

Example 10

This example describes the production of p-tolyldiphenyls (a mixture of isomers) from diphenyl and p-toluene-sulphonyl chloride.

20 grams of p-toluenesulphonyl chloride and 250 grams of diphenyl was heated under reflux at a temperature of about 230° C. for 3 hours.

Excess diphenyl was removed from the reaction mixture by distillation, and continued distillation of the residue gave 14.1 grams of p-tolyldiphenyls as a fraction having a boiling range of 136 to 160° C. at a pressure of 0.3 mm. of mercury, p(p-Tolyl)diphenyl, a solid having a melting point of 202 to 207° C. was isolated from a sample by recrystallization from ethanol.

Example 11

This example describes the production of tolyl-naphthalene from p-toluenesulphonyl chloride and naphthalene.

A mixture of 19 grams (0.1 mol.) of p-toluenesulphonyl chloride and 133 grams (1.04 mol.) of naphthalene was boiled under reflux at a temperature of about 220° C. for two hours.

Excess naphthalene was distilled from the reaction product, and further distillation of the residue gave a main fraction having a boiling range of 125 to 150° C. at a pressure of 0.25 mm. of mercury, and a smaller fraction having a boiling range of 150 to 280° C. at the same pressure. The combined weight of the two fractions was 18.6 grams. The main fraction consisted essentially of a mixture of isomers of mono-p-tolylnaphthalene, and the higher boiling fraction contained di-p-tolylnaphthalene.

Example 12

This example describes the production of p-isopropylphenylnaphthalenes from naphthalene and p-isopropylbenzenesulphonyl chloride.

A mixture of 19.3 grams (0.088 mol.) of p-isopropylbenzenesulphonyl chloride and 117 grams (0.91 mol.) of naphthalene was boiled under reflux at a temperature of about 218–221° C. for 18 hours.

Excess naphthalene was distilled from the reaction product, leaving a residue which on distillation gave a main fraction having a boiling range of 145 to 170° C. at a pressure of 0.25 mm. of mercury, and a smaller fraction having a boiling range of 170 to 280° C. at the same pressure. The combined weight of the two fractions was 13.2 grams. The main fraction consisted essentially of an isomeric mixture of mono(p-isopropylphenyl)naphthalenes, and the higher boiling fraction contained di(p-isopropylphenyl)naphthalenes.

Example 13

This example describes the production of t-butylterphenyls and di-t-butylquaterphenyls from diphenyl and p-t-butylbenzenesulphonyl chloride.

A mixture of 13 grams of p-t-butylbenzenesulphonyl chloride and 130 grams of diphenyl was heated under reflux at a temperature of about 250° C. for 3 hours.

Excess diphenyl was distilled from the reaction mixture; distillation of the residue gave 14.7 grams of a product having a boiling range of 150 to 250° C. at a pressure of 0.35 mm. of mercury. Its principal components were t-butylterphenyls of which 2(p-t-butylphenyl)diphenyl predominated, together with a minor proportion of di-t-butylquaterphenyls.

Example 14

This example describes the production of p-t-butylphenylnaphthalenes from naphthalene and p-t-butylbenzenesulphonyl chloride.

A mixture of 13.07 grams of p-t-butylbenzenesulphonyl chloride and 90 grams of naphthalene was boiled under reflux at a temperature of about 220° C. for 20 hours.

Excess naphthalene was distilled from the reaction mixture; distillation of the residue at a pressure of 0.35 mm. of mercury gave a main fraction having a boiling range of 145 to 160° C., consisting essentially of a mixture of isomeric(mono-p-t-butylphenyl)naphthalenes, and a smaller fraction having a boiling range of 150 to 260° C. containing bis(p-t-butylphenyl)naphthalenes. The combined weight of the two fractions was 13.8 grams.

Example 15

This example describes the production of nitroterphenyls from diphenyl and p-nitrobenzenesulphonyl chloride.

A mixture of 20 grams (0.09 mol.) of p-nitrobenzenesulphonyl chloride and 208 grams (1.35 mol.) of diphenyl was boiled under reflux at a temperature of 255–257° C. for 2½ hours.

Excess diphenyl was distilled from the reaction mixture and the residue thus obtained was extracted with chloroform. Removal of the solvent from the chloroform extract gave 26.5 grams of a red oily solid which on analysis by vapor phase chromatography was shown to be a mixture of 2-, 3- and 4(p-nitrophenyl)diphenyls (of which the 2-isomer predominated), together with a small amount of residual diphenyl. A sample of the solid was dissolved in benzene and passed through a column of chromatogram-grade alumina. Evaporation of the solvent from the main eluate from the column gave a residue which was then redissolved in warm ethanol. On cooling, the ethanolic solution deposited crystals of 4(p-nitrophenyl)diphenyl having a melting point of 205° C.

Example 16

This example describes the production of sexiphenyls from diphenyl and 4,4'-diphenyldisulphonyl chloride.

A mixture of 7 grams (0.02 mol.) of 4,4'-diphenyldisulphonyl chloride and 92.5 grams (0.6 mol.) of diphenyl was heated under reflux at a temperature of about 250–255° C. for 3 hours.

At the end of this time, excess diphenyl was distilled from the reaction mixture, leaving 9.6 grams of a residue which set to a brown solid on cooling. This material gave the following elementary analysis:

C, 93.1; H, 5.76; S, 1.6%; consistent with it being essentially a mixture of isomeric sexiphenyls. $C_{36}H_{26}$, which requires:

C, 94.3; H, 5.7%.

*Example 17*

This example describes the production of pyridyldiphenyls from diphenyl and pyridine-3-sulphonyl chloride.

A mixture of 17.2 grams (0.1 mol.) of pyridine-3-sulphonyl chloride and 231 grams (1.5 mol.) of diphenyl was boiled under reflux at a temperature of about 255–257° C. for 1½ hours.

Excess diphenyl was distilled from the reaction mixture; distillation of the residue gave 11.1 grams of a fraction having a boiling range of 146 to 176° C. at a pressure of 0.7 mm. of mercury and 3 grams of a fraction having a boiling range of 176 to 186° C. at the same pressure. Both fractions solidified on cooling and consisted essentially of isomeric mixtures of mono(3-pyridyl)diphenyls. By recrystallization of the higher boiling fraction from ethanol, 4(3'-pyridyl)diphenyl was isolated as a solid having a melting point of 152 to 153° C. (Found: C, 88.72; H, 5.74; N, 6.15. $C_{17}H_{13}N$ requires: C, 88.34; H, 5.64; N, 6.05%.)

While the invention has been described herein with regard to several specific embodiments, it is not so limited. It is to be understood that modifications and variations of the invention, obvious to those skilled in the art, may be made without departing from the spirit and scope of said invention.

The embodiments of the invention in which an exclusive property or privilege is claimed are defined as follows:

1. A process for replacing a hydrogen atom on a nuclear carbon atom of an aromatic compound with an aryl group, said aryl group being selected from the class consisting of phenyl, alkylphenyl, alkoxyphenyl, nitrophenyl, halophenyl, naphthyl, diphenylyl, pyridyl, quinolinyl, furyl, thienyl and mono- and dibenzo furyl and thienyl, and said aromatic compound being selected from the class consisting of:

(a) benzene, indene, anthracene, naphthalene and diphenyl;

(b) alkyl-, alkoxy- and halo-benzene, anthracene, naphthalene and diphenyl;

(c) terphenyl, quaterphenyl, diphenyl ether, anisole and phenetole;

(d) furan, thiophene and mono- and dibenzo furan and thiophene;

(e) alkyl-, alkoxy-, halo-, cycloalkyl- and phenyl-furan, thiophene, and mono- and dibenzo furan and thiophene; and (f) quinoline and pyridine, said process comprising heating, at a temperature of from about 125° C. to about 300° C., said aromatic compound with a compound of the formula $RZ_n$, where $n$ is an integer from 1 to 2, R represents said aryl group, and Z is selected from the class consisting of —$SO_2OH$, the ammonium salt of —$SO_2OH$ and —$SO_2X$ where X represents halogen, each radical represented by Z being attached to a nuclear carbon atom of R.

2. A process as defined in claim 1 wherein $RZ_n$ is benzenesulfonyl halide.

3. A process as defined in claim 1 wherein said aromatic compound is diphenyl.

4. A process as defined in claim 1 wherein $RZ_n$ is alkylbenzenesulfonyl halide.

5. A process as defined in claim 1 wherein $RZ_n$ is benzene disulfonyl halide.

6. A process as defined in claim 1 wherein $RZ_n$ is benzene sulfonic acid.

7. A process as defined in claim 1 wherein said aromatic compound is alkylbenzene.

8. A process as defined in claim 1 wherein said aromatic compound is diphenyl ether.

9. A process as defined in claim 1 wherein said aromatic compound is diphenyl.

References Cited by the Examiner

Egli, Ber Deut. Chem., vol. 18, pages 575–577 (1885).
Eikhman et al., Chem. Abstracts, vol. 29, col. 2520 (1935).
Otto, Ber Deut. Chem., vol. 19, page 2425 (1886).
Stenhouse, Beilstein (Handbuch 4th ed.), vol. 11, page 27 (1928).
Stenhouse, Liebigs Ann., vol. 140, pages 287–293 (1886).

WALTER A. MODANCE, *Primary Examiner.*

DUVAL T. McCUTCHEN, *Examiner.*